(12) United States Patent  
Norimatsu et al.

(10) Patent No.: US 7,876,069 B2
(45) Date of Patent: Jan. 25, 2011

(54) ELECTRICAL POWER UNIT

(75) Inventors: Yasuaki Norimatsu, Ibaraki (JP); Akihiko Kanouda, Ibaraki (JP); Mutsumi Kikuchi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 11/913,681

(22) PCT Filed: Apr. 26, 2006

(86) PCT No.: PCT/JP2006/308710

§ 371 (c)(1),
(2), (4) Date: Nov. 6, 2007

(87) PCT Pub. No.: WO2006/120901

PCT Pub. Date: Nov. 16, 2006

(65) Prior Publication Data

US 2009/0079382 A1    Mar. 26, 2009

(30) Foreign Application Priority Data

May 6, 2005    (JP)    ............................. 2005-135014

(51) Int. Cl.
*H02J 7/00* (2006.01)
(52) U.S. Cl. ............................. 320/132; 320/DIG. 18; 320/DIG. 21
(58) Field of Classification Search ................. 320/132, 320/DIG. 18, DIG. 19, DIG. 21
See application file for complete search history.

(56) References Cited

U.S. PATENT DOCUMENTS

| 6,428,918 | B1* | 8/2002 | Fuglevand et al. | ............ 429/13 |
| 2004/0170875 | A1* | 9/2004 | Ozeki et al. | .................... 429/22 |
| 2004/0224198 | A1* | 11/2004 | Ninomiya et al. | ............. 429/22 |
| 2006/0192523 | A1 | 8/2006 | Nomoto | |

FOREIGN PATENT DOCUMENTS

| JP | 07-295685 | 11/1995 |
| JP | 08-195693 | 7/1996 |
| JP | 3140806 | 12/2000 |
| JP | 2004-220845 | 8/2004 |
| JP | 2005-032039 | 2/2005 |

* cited by examiner

*Primary Examiner*—Edward Tso
*Assistant Examiner*—Samuel Berhanu
(74) *Attorney, Agent, or Firm*—Antonelli, Terry, Stout & Kraus, LLP.

(57) ABSTRACT

A fuel cell 1 and an electric double-layer capacitor 2 are parallelly arranged for a power supply. A DC/DC converter 3 steps up voltage of the fuel cell 1 and the electric double-layer capacitor 2, to thereby output power. An output switch 5 is disposed on an output pathway of the DC/DC converter 3. By controlling the output switch 5 with a control IC 4, output power can be switched on and off. When there is a fuel shortage or abnormality in the fuel cell 1, the control IC 4 controls the output switch 5, to thereby intermittently alter the output power. With this configuration, when the power supply is used for a mobile telephone as a portable electronic device connected thereto, a user can confirm whether there is a fuel shortage or a fuel cell abnormality by checking of blinking state of a charge pilot lamp of the mobile telephone.

3 Claims, 16 Drawing Sheets

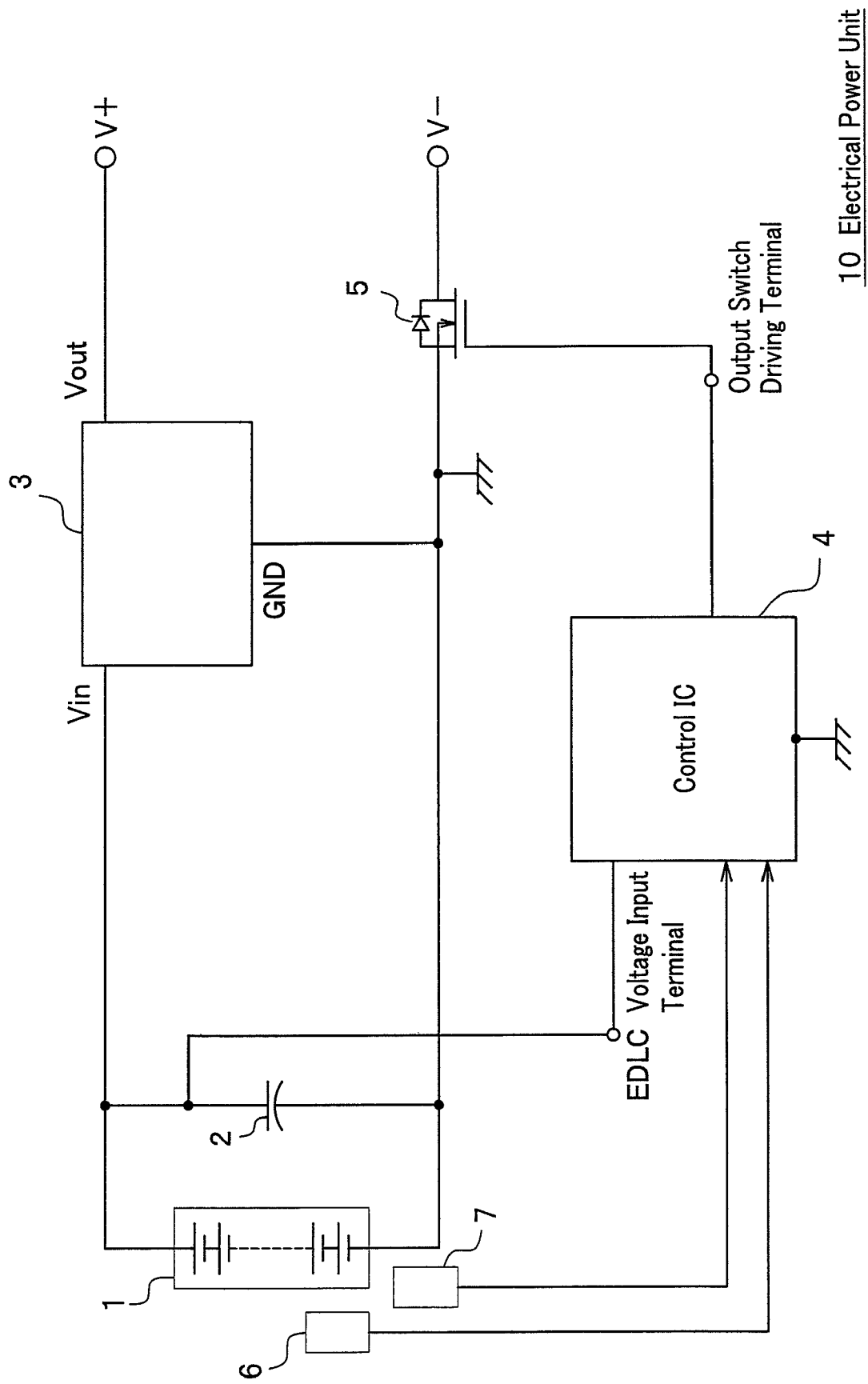

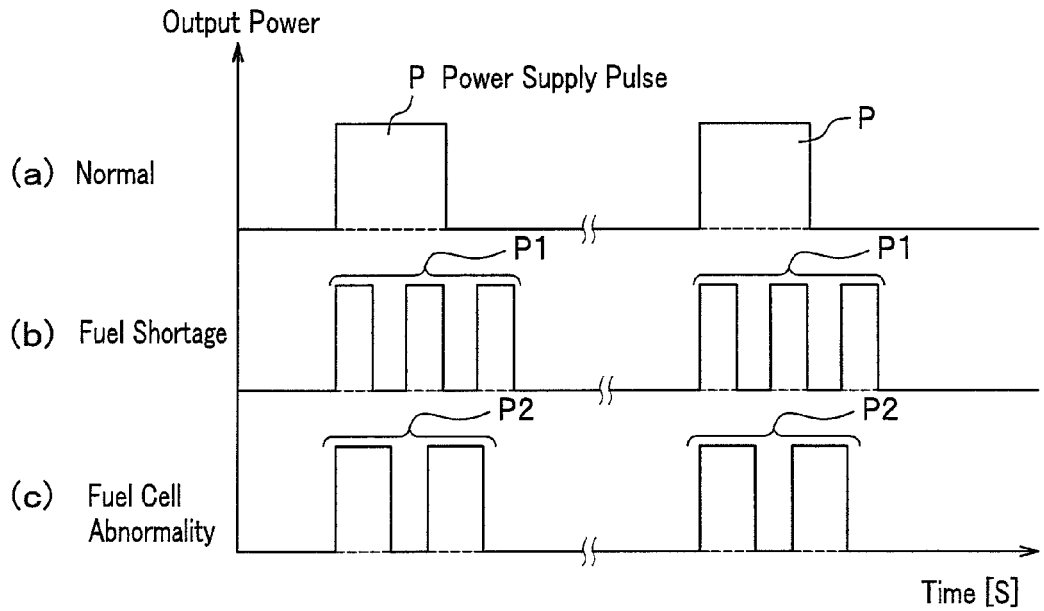
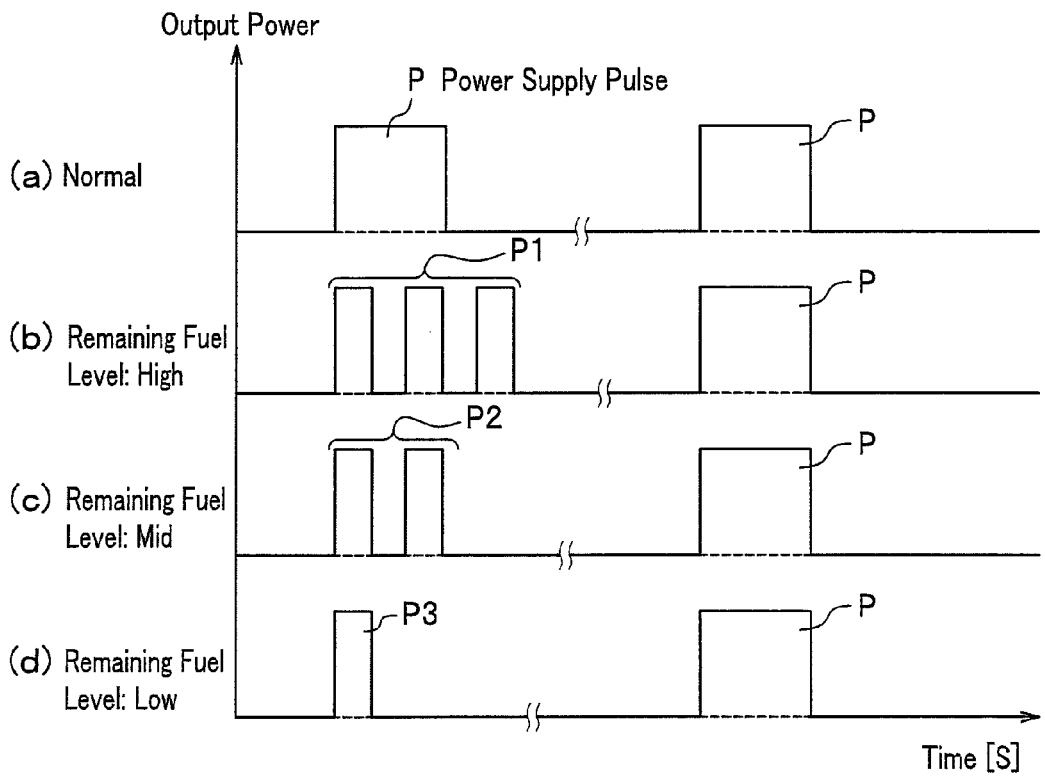

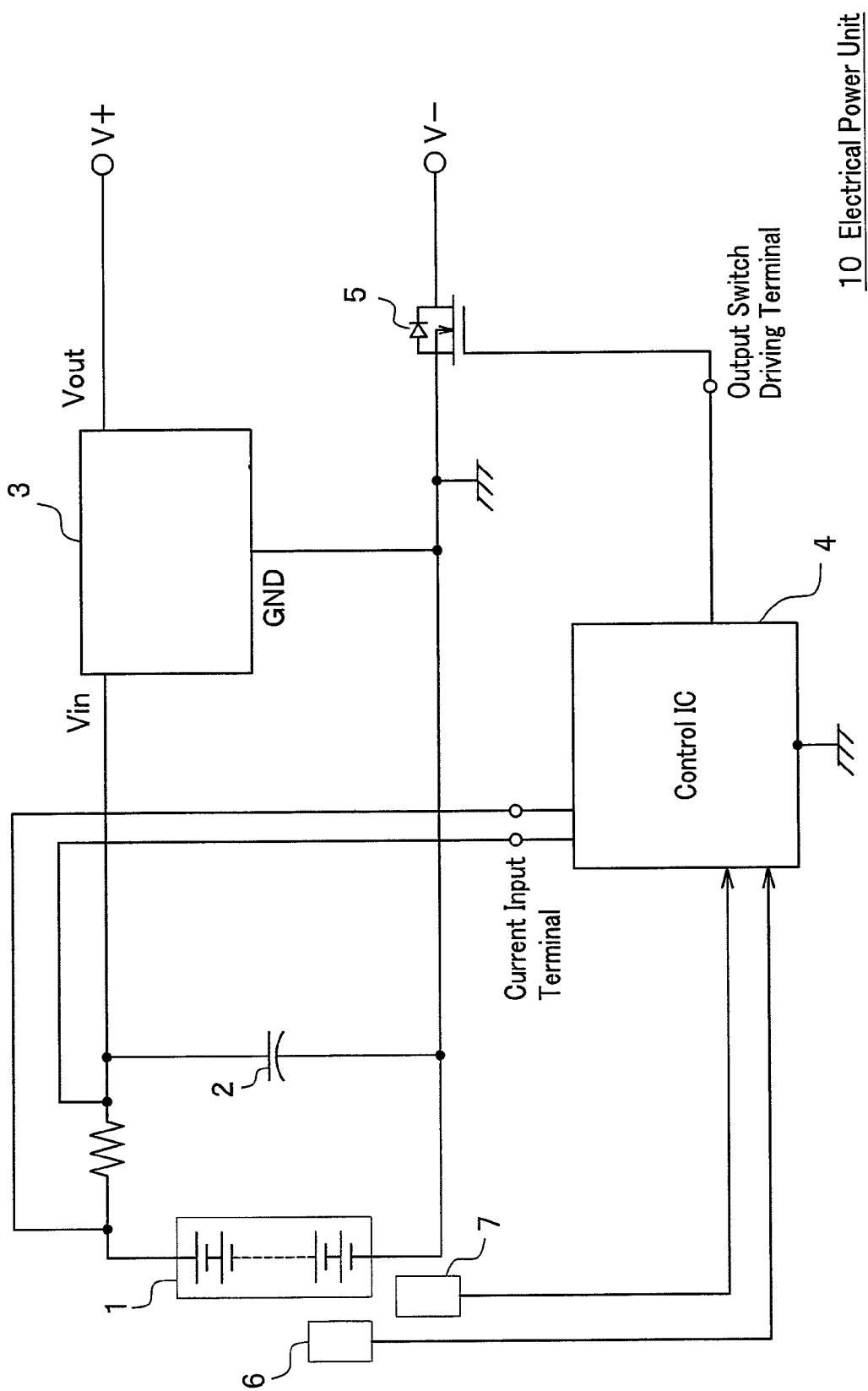

ELECTRICAL POWER UNIT

TECHNICAL FIELD

The present invention relates to an electrical power unit to be connected to an electronic device having an electric storage means, such as a secondary cell, for supplying power to the electronic device.

BACKGROUND ART

Due to recent developments in electronics, use of portable electronic devices, such as mobile telephone, portable personal computer, audio-visual device and mobile terminal equipment, has been rapidly spreading. A secondary cell used in such a portable electronic device has been developed from a conventional sealed lead battery, to a nickel-cadmium cell and a nickel-metal-hydride cell, further to a lithium-ion cell. As for any of these cells, attempts have been made to achieve a high energy density by developing cell active materials and cell structures with high-capacity, so as to realize a power source with a longer operating time. On the other hand, in the portable electronic devices, efforts have been made to reduce power consumption, and the power consumption per function has been reduced. However, it is expected that the total power consumption will further increase, since new functions will be added for upgrading the device, in order to satisfy user demands.

In the portable electronic devices, a capacity of the secondary cell mounted therein is limited, due to spacial limitation of a casing. In order to ensure a long operating time, it is necessary to introduce an external electrical power unit for supplying power, which is to be connected to the electronic device. When the electrical power unit, also called sub-battery, is used, it becomes especially important to check a remaining battery level. Conventionally, the electrical power unit has a light emitting diode or a liquid crystal display to display the remaining battery level.

However, adding a display function device, such as the light emitting diode and the liquid crystal display, to the electrical power unit increases a production cost. In addition, energy is consumed for displaying the remaining battery level, which reduces an energy density of the electrical power unit.

Therefore, it would be desirable to provide an electrical power unit that can reduce expenses, with which a user can still check internal states, including a remaining battery level, of the electrical power unit without reducing the energy density.

DISCLOSURE OF THE INVENTION

The present invention provides an electrical power unit for being connected to an electronic device including an electric storage means and displaying a charge state when the electric storage means is charged, which electrical power unit includes an electric power source for supplying power to the electronic device, and a transmission means for intermittently altering output power of the electric power source and transmitting specific information, and allows the electronic device to display the specific information by altering a displaying mode of the electronic device when the electronic device is supplied with power.

With this configuration, when the electronic device is supplied with power, the transmitted specific information can be displayed utilizing a display function of the electronic device, by altering the output power. For example, when remaining battery level information of the electrical power unit is transmitted, a user can confirm a remaining battery level indicated on a display means of the electronic device, by checking the change in the display in accordance with an intermittence of the output power.

According to the present invention, by simply altering the power output to the electronic device, the specific information, such as the remaining battery level, becomes checkable. Therefore, it becomes possible to omit a display means in the electrical power unit, leading to a reduced cost and an improved energy density. As a result, an electrical power unit which ensures a longer operating time is obtained.

The various aspects, other advantages and further features of the present invention will become more apparent by describing in detail illustrative, non-limiting embodiments thereof with reference to the accompanying drawings.

BRIEF DESCRIPTION OF DRAWINGS

FIG. 1 is a circuit diagram of an electrical power unit according to a first embodiment.

FIG. 2 is a diagram showing output power in a case where a pulse number is altered in accordance with a fuel shortage and a fuel cell abnormality.

FIG. 3 is a diagram showing output power in a case where a pulse number is altered in accordance with a remaining fuel level, as an example of time division.

FIG. 17 is a circuit diagram of an electrical power unit in which a control is performed based on an output current of a fuel cell.

BEST MODE FOR CARRYING OUT THE INVENTION

Figure 4:
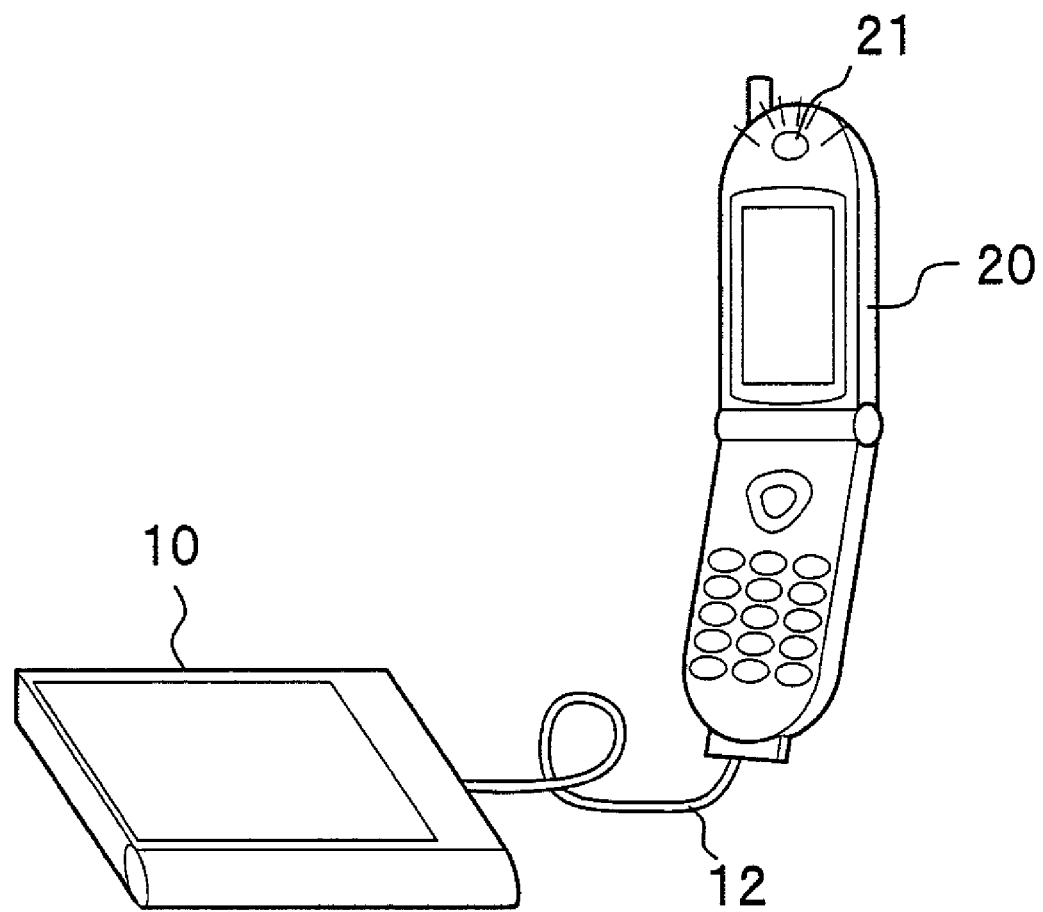
FIG. 4 is an explanatory diagram in which an electrical power unit is used with a mobile telephone.

Hereinafter, embodiments of the present invention will be described with reference to the drawings.

FIG. 1 shows a circuit diagram of an electrical power unit according to a first embodiment.

As shown in FIG. 1, an electrical power unit 10 according to the first embodiment includes: a cell 1 and an electric storage means 2 as electric power sources; a circuit part 3; a control IC 4; and an output switch 5. The cell 1 and the electric storage means 2 are parallelly arranged, with both ends thereof being connected to an input terminal Vin and a ground (GND) terminal of the circuit part 3. To the Vin terminal of the circuit part 3, positive terminals of the cell 1 and the electric storage means 2 are connected, and to the ground (GND) terminal, negative terminals are connected. The circuit part 3 is for transforming output voltage into output power, with an output terminal Vout thereof being connected to an output terminal V+, and the ground terminal connected to an output terminal V− through the output switch 5 formed of an N-channel power MOSFET. A control terminal of the output switch 5 is connected to an output switch driving terminal of the control IC 4. The positive terminal of the electric storage means 2 is connected to an EDLC voltage input terminal of the control IC 4. To the control IC 4, values detected at a remaining fuel level detector 6 and a temperature sensor 7 are output. Based on the voltages of the cell 1 and the electric storage means 2, and the detected values from the remaining fuel level detector 6 and the temperature sensor 7, the control IC 4 determines a remaining battery level and a cell state of the cell 1 and electric storage means 2, and transmits the determined results as information by switching the output switch 5 on and off. Herein, the control IC 4 and the output switch 5 correspond to a transmission means in the appended claims.

In the first embodiment, a fuel cell is used for the cell 1. Since the electrical power unit 10 is used for a portable electronic device connected thereto, for the fuel cell, a direct methanol fuel cell (DMFC) utilizing a methanol-water solution as a fuel is used. However, a modified version thereof or a fuel cell using a direct hydrogen fuel may also be used.

For the electric storage means 2, an electric double-layer capacitor (EDLC) is used. The electric storage means 2 is charged by the cell 1, and outputs power when a power supply from the cell 1 alone is not sufficient. Accordingly for the electric storage means 2, for example, a lithium-based secondary cell can be used instead of the electric double-layer capacitor. In this case, it is desirable that a high-output type cell used for a hybrid electric vehicle (HEV) or the like be used.

For a combination of the cell 1 and the electric storage means 2 that supplies power, any combination may be used as long as the cell 1 is characterized as a power source with a high energy density and the electric storage means 2 is characterized as a power source with a high power density. For example, a combination of a lithium-ion cell as the cell 1 and the electric double-layer capacitor as the electric storage means 2 can be used.

For transforming voltage, a DC/DC converter is used in the circuit part 3, so as to make the output voltage therefrom correspond to the voltage of the portable electronic device. In the first embodiment, a step-up converter is used in order to reduce the number of serial connection in the cell 1 and the electric storage means 2. However, depending on the voltage of the portable electronic device, a step-up/step-down converter or a step-down converter may be used.

Hereinafter, an explanation is made in a case where the direct methanol fuel cell is used as the cell 1, and the electric double-layer capacitor is used as the electric storage means 2. It should be noted that, in the following descriptions including other embodiments, the cell 1, the electric storage means 2 and the circuit part 3 are referred to as fuel cell 1, electric double-layer capacitor 2 and DC/DC converter 3, respectively. The remaining fuel level detector 6 and the temperature sensor 7 detect a remaining fuel level and a temperature, respectively, of the fuel cell 1.

In the first embodiment, a portable electronic device is an object to be supplied with power by the electrical power unit 10. An output power of the fuel cell 1 is set so as to corresponds to an average value of the power required in the portable electronic device (not shown), and thus set smaller than the maximum power required. A shortfall in the required power is compensated from the electric double-layer capacitor 2. With this setting, the electrical power unit 10 can be made compact as compared with an electrical power unit in which the output power is set to correspond to the maximum power required in the portable electronic device. Since the output power of the fuel cell 1 is set corresponding to the average value, the electrical power unit 10 outputs the power to an external system when the power is stored in the electric double-layer capacitor 2; while the electrical power unit 10 stops the power output to the external system, when the electric double-layer capacitor 2 is charged. This control can be realized by the control IC 4 that obtains the voltage of the electric double-layer capacitor 2 and switches the output switch 5 on and off in accordance with the voltage of the electric double-layer capacitor 2.

Specifically, the control IC 4 checks the voltage of the electric double-layer capacitor 2 input through the EDLC voltage input terminal, and when the voltage exceeds an upper limit voltage set as a threshold value, the control IC 4 outputs a control signal to the output switch 5, and switches the output switch 5 on. As a result, the fuel cell 1 and the electric double-layer capacitor 2 output the power in parallel, to the portable electronic device connected to the output terminals V+, V−. As the power is output, the voltage of the electric double-layer capacitor 2 decreases, as does the output voltage of the fuel cell 1. When the voltage of the electric double-layer capacitor 2 reaches a lower limit voltage value set as a threshold value, the control IC 4 stops the output of the control signal and switches the output switch 5 off.

When the output switch 5 is switched off and the power output to the external system is stopped, a load is reduced which in turn increases the output voltage of the fuel cell 1, which then charges the electric double-layer capacitor 2. When the voltage of the electric double-layer capacitor 2 reaches the upper limit voltage set as a threshold value as a result of the charging, the control IC 4 outputs a control signal and switches the output switch 5 on. Consequently, the fuel cell 1 and the electric double-layer capacitor 2 again supply the power to the portable electronic device. In this manner, the portable electronic device is supplied with power by repeated output of a power supply pulse P at a specific interval, as shown in (a) of FIG. 2.

The fuel cell 1 is provided with the remaining fuel level detector 6 and the temperature sensor 7, and based on the detection signals therefrom, the control IC 4 determines a fuel supply state of the fuel cell 1 or determines whether or not there is an abnormality in the fuel cell 1. When it is determined that there is a fuel shortage or an abnormality in the fuel cell 1, the control IC 4 divides timewise the power supply pulse P shown in (a) of FIG. 2 into, for example, a pulse group P1 shown in (b) or a pulse group P2 in (c), and outputs the divided pulses. Specifically, the control IC 4 stores various control patterns corresponding to a fuel shortage and abnormalities in the fuel cell 1, and when it is determined that there is a fuel shortage or an abnormality in the fuel cell 1, the control IC 4 applies a corresponding control pattern to divide timewise the power supply pulse P, by switching the output switch 5 on and off.

Accordingly, when the fuel runs out, as shown in (b) of FIG. 2, the pulse group P1 obtained by dividing the normal power supply pulse P is output to the portable electronic device. In the case of an abnormality in the fuel cell 1, as shown in (c), the pulse group P2 obtained by dividing the normal power supply pulse P is output to the portable electronic device. Since a width of the pulse output for a fuel shortage is set smaller than a width of the pulse output when the fuel cell 1 is in an abnormal state, and a quiescent time in each pulse group is set equal, it can be confirmed whether or not there is a fuel shortage or an abnormality in the fuel cell 1, by reading the difference in the pulse group appearing on the portable electronic device. Since the portable electronic device typically has a charge pilot lamp that lights when power is supplied, a user can confirm whether or not there is an abnormal state of the electrical power unit 10, by checking a blinking state of the charge pilot lamp, and can further confirm whether the state is a fuel shortage or an abnormality in the fuel cell 1. In this case, by utilizing a standard function of displaying a charge state provided in the typical portable electronic device, a cell state in the electrical power unit 10 can be confirmed. Of course, the checked result can be displayed by other means, such as voice, by providing the portable electronic device with a function of checking the pulse number and the pulse width.

As shown in FIG. 2, the division of the power supply pulse with a control pattern can be applied to all power supply pulses P. Alternatively, the division can be applied solely to the first power supply pulse P after detecting an abnormality or the like. With respect to the control pattern, the division number of the pulse can be altered in accordance with a fuel state or an abnormal state in the fuel cell 1. With respect to the division number of the power supply pulse, the number may be altered in accordance with a number of power supply pulse P, for example, two divided pulses for the first power supply pulse, three divided pulses for the second power supply pulse, and so forth.

FIG. 3 is a diagram showing output power in a case where a pulse number is altered in accordance with a remaining fuel level, as an example of time division.

When the remaining fuel level is high, the normal power supply pulse P shown in (a) of FIG. 3 is divided into three pulses, such as a pulse group P1 shown in (b), and output. When the remaining fuel level is medium, the normal power supply pulse P is divided into two pulses, such as a pulse group P2 shown in (c), and output. When the remaining fuel level is low, the normal power supply pulse P is converted into one pulse with a smaller pulse width, such as a pulse P3 shown in (d), and output. It should be noted that, in FIG. 3, the pulse group P1 and the pulse group P2 differ only in the pulse number, and are the same in the pulse width and the quiescent time.

Even in this case, the fuel state in the fuel cell can be confirmed in the portable electronic device, by counting the pulse number. When the portable electronic device is provided with a charge pilot lamp, the fuel state can be confirmed by a short blinking of the charge pilot lamp.

FIG. 4 is an explanatory diagram in which an electrical power unit is used with a mobile telephone connected thereto.

Herein, a mobile telephone 20 is used as the portable electronic device. The electrical power unit 10 is connected to the mobile telephone 20 through a cord 12. The electrical power unit 10 has a circuit shown in FIG. 1 built therein, and the cord 12 is connected to the output terminals V+, V− of the circuit. Therefore, power can be supplied to the mobile telephone 20, by a control on a side of the electrical power unit 10.

On the mobile telephone 20, a charge pilot lamp 21 is mounted as a standard function, which lights when charging is performed on a secondary cell built in the mobile telephone 20. When the electrical power unit 10 supplies power to the mobile telephone 20 as a portable electronic device, the charge pilot lamp 21 blinks in accordance with the power pulses shown in FIG. 2 or FIG. 3. With this feature, a user can confirm whether or not there is a fuel shortage or an abnormality in the fuel cell 1, or confirm a fuel state in the fuel cell 1, by checking a blinking state of the charge pilot lamp 21, without modifying the portable electronic device. It should be noted that, in a case of the mobile telephone in which a charge icon is displayed on a liquid crystal display when charging, the information described above can be confirmed by checking the blinking of the charge icon.

As described above, the states of the fuel cell 1 are classified mainly into the remaining fuel level (fuel shortage) and the fuel cell abnormality. With respect to the fuel (a methanol-water solution is used), when the fuel is reduced nearly to zero, the power from the fuel cell 1 decreases, and thus a duty ratio of the power supply to the mobile telephone becomes notably small. That is, a period of lighting of the charge pilot lamp 21 becomes short. With respect to the abnormality in the cell 1, representative examples include: an output limit set by a control initiated when the temperature exceeds a specific threshold value (e.g., 45° C.) (the temperature of the fuel cell rises with the progress of the reaction); hindrance to an oxygen supply due to water clogging in an air electrode, caused in accordance with the fuel cell power generation; and a decline of power output due to hindrance to a methanol-water solution supply due to carbon dioxide clogging in an fuel electrode.

As a common characteristic between the fuel shortage and the fuel cell abnormality, there can be mentioned a decline of power output. Since a user can check whether or not there is a decline of power output by blinking state of the charge pilot lamp 21 in the mobile telephone 20, the problem can be easily solved by replacing the fuel cartridge, in the case of the fuel shortage. In the case of the abnormality in the fuel cell 1, as shown in FIG. 2, a power pulse with a width different from that in the case of the fuel shortage is output, and thus the abnormality is distinguishable from the fuel shortage by the blinking state of the charge pilot lamp 21, against which a measure can be taken, such as turning off the power source.

Next, detection of the remaining fuel level and the abnormality in the fuel cell will be described.

Figure 5:
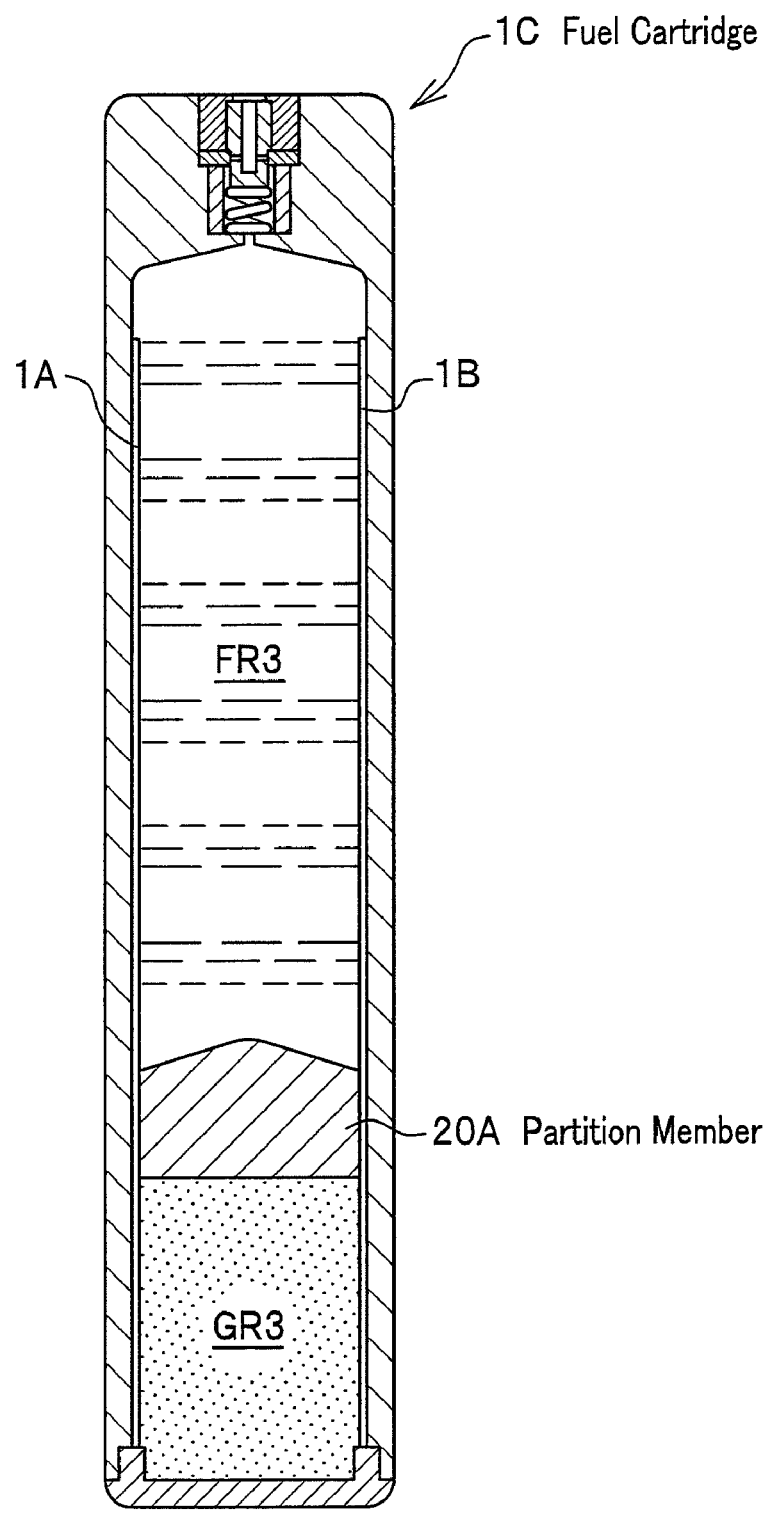
FIG. 5 is a cross sectional view showing a configuration of a fuel cartridge.

FIG. 5 is a cross sectional view showing a fuel cartridge used in the fuel cell.

Electrodes 1A, 1B are opposingly provided on an inner circumference of a fuel cartridge 1C. A fuel FR3 is composed of a methanol-water solution that receives a pressure from a compressed gas GR3 through a partition member 20A. When the fuel FR3 is consumed, the partition member 20A moves upward, and thus a space above the partition member 20A is always filled with the fuel FR3. Depending on the remaining level of the fuel FR3 in the fuel cartridge 1C, surface areas of the electrodes 1A, 1B with which the fuel FR3 comes into contact differ, and thus by measuring a resistor between the electrodes 1A and 1B, the remaining fuel level can be detected.

In the fuel cell 1, when water clogging or carbon dioxide clogging, for example, occurs, the output voltage rapidly decreases. By detecting the rapid decrease of the voltage, water clogging or carbon dioxide clogging can be detected.

In addition, when the methanol concentration becomes abnormally high, there occurs a phenomenon in which a temperature rises in the fuel cell 1 even though the output voltage does not increase. Therefore, when a high temperature is detected while the output voltage is low, it is determined that the concentration of methanol is high.

Further, when the output current requested by the portable electronic device is increased but the requested power generation is not performed and the temperature remains low, it is determined that the concentration of methanol in the fuel cell 1 is low.

When these abnormalities are detected, the control IC 4 applies a corresponding pattern as described above, to divide timewise the power supply pulse P as shown in FIG. 2, and output the divided pulses. As a result, a user can confirm whether or not there is an abnormality by, for example, checking a blinking state of the charge pilot lamp 21 of the mobile telephone 20.

As described above, according to the electrical power unit 10 of the first embodiment, the remaining fuel level or the fuel cell abnormality can be determined even though the function of displaying a cell state is not provided in the electrical power unit 10, leading to a cost reduction. In addition, since no energy is used for displaying, an energy density can be improved.

In the first embodiment, the description is made while illustrating that a user confirms a fuel shortage or an abnormality in the fuel cell 1 by checking a blinking state of the charge pilot lamp 21. However, the width and number of the power pulse may be detected by a circuit in the portable electronic device, and displayed with another mode, or used for control, such as switching of the portable electronic device to a low-power consumption mode.

In the first embodiment, a fuel cell is used for the cell 1. Therefore, the operating time can be elongated by supplying a fuel, with replacing the fuel cartridge 1C. Likewise, for the purpose of a continuous usage, a replaceable primary cell is used instead of the fuel cell 1, and power can be supplied by a combination of the primary cell and the electric double-layer capacitor 2.

For the control IC 4, a specialized IC is desirable in order to achieve the functions thereof. However, the IC can be replaced with a comparator, a microprocessor or the like.

Finally, the output switch 5 uses the N-channel power MOSFET on the ground side as shown in FIG. 1, but may use a P-channel power MOSFET on the V+ side, or may be replaced with other switching elements.

In the first embodiment, the supplied power supply pulse P is divided timewise to transmit information, such as a fuel state and an abnormality in the fuel cell 1, to the mobile telephone 20, and the information is displayed on the mobile telephone 20 utilizing the charge display function of the mobile telephone 20 equipped as a standard function. When the power of the fuel cell 1 is available, the electric double-layer capacitor 2 does not output power, and thus the continuous power is supplied to the portable electronic device. Even in this case, by switching the output switch 5 on and off as described above at a predetermined interval, information such as a fuel state and an abnormality in the fuel cell 1 can be transmitted and displayed. It should be noted that, for information transmitted to the portable electronic device, a variety of information can be used, such as voltage information and abnormal current information of the fuel cell 1.

Next, a second embodiment will be described.

Figure 6:
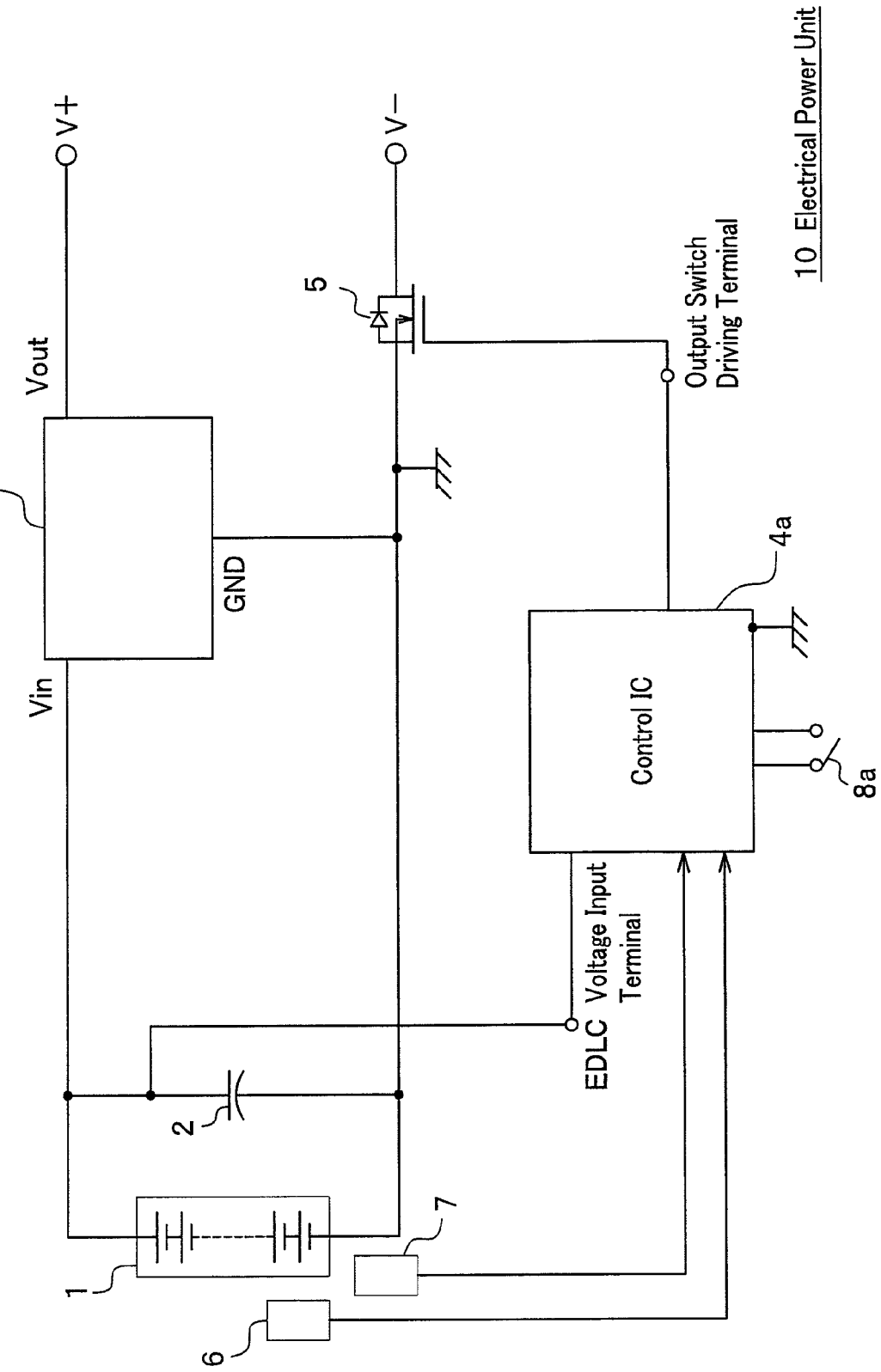
FIG. 6 is a circuit diagram of an electrical power unit according to a second embodiment.

FIG. 6 is a circuit diagram of an electrical power unit according to a second embodiment. This electrical power unit is different from one shown in FIG. 1, in that a changeover switch 8*a* is added to the control IC 4*a*, which is operable by a user. The fuel cell 1, the electric double-layer capacitor 2, the output switch 5 and the like are the same as those in the first embodiment.

For the changeover switch 8*a*, a common direct current (DC) switch, such as a tactile switch and a push switch, can be used.

In the first embodiment, when it is determined that there is a fuel shortage or an abnormality in the fuel cell 1, the power supply pulse P shown in (a) of FIG. 2 is divided timewise into, for example, a pulse group P1 of (b) or a pulse group P2 of (c) and output. Therefore, when there is an abnormality, the power pulse obtained by dividing the power supply pulse P is always output. In the second embodiment, the division of the power supply pulse P, i.e., a display of a cell state, is performed depending on the arbitrary operation of a user.

Specifically, when the changeover switch 8*a* is opened, the control IC 4*a* performs a normal control. In this case, the control IC 4*a* checks the voltage of the electric double-layer capacitor 2 input through the EDLC voltage input terminal, and when the voltage exceeds the set upper limit voltage, the control IC 4*a* outputs a control signal to the output switch 5, and switches the output switch 5 on, to thereby output power from the fuel cell 1 and the electric double-layer capacitor 2. As an electrical discharge proceeds, the voltage of the electric double-layer capacitor 2 decreases, as does the output voltage of the fuel cell 1. When the voltage of the electric double-layer capacitor 2 reaches the set lower limit voltage value, the control IC 4 stops the output of the control signal to thereby stop the power supply.

In this case, as shown in (a) of FIG. 2 or (a) of FIG. 3, the normal power supply pulse P is output. This control continues while the changeover switch 8*a* is opened. When the changeover switch 8*a* is closed, as shown in (e) of FIG. 7, an input signal is input to the control IC 4*a*, and then values detected at the remaining fuel level detector 6 and the temperature sensor 7 are input. When it is determined that there is a fuel shortage or an abnormality in the fuel cell 1, the control IC 4 applies a corresponding control pattern to divide timewise the power supply pulse P, by switching the output switch 5 on and off.

Figure 7:
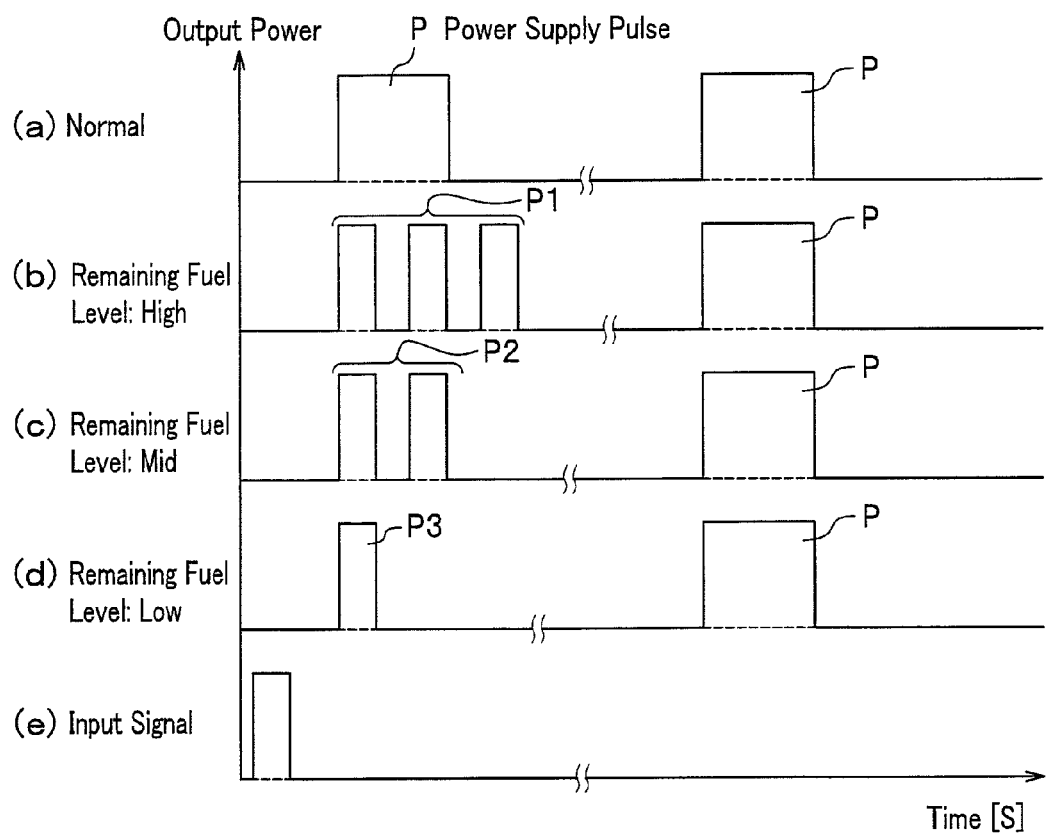
FIG. 7 is a diagram showing output power in a case where a pulse number is altered in accordance with a remaining fuel level, as an example of time division.

FIG. 7 is a diagram showing output power in a case where a pulse number is altered in accordance with a remaining fuel level, as an example of time division.

In this case, like in FIG. 3, when the remaining fuel level is high, the normal power supply pulse P is divided into three pulses as shown in (b), and output. When the remaining fuel level is medium, the normal power supply pulse P is divided into two pulses as shown in (c), and output. When the remaining fuel level is low, the normal power supply pulse P is converted into one pulse with a smaller pulse width as shown in (d), and output.

According to the second embodiment, the control IC 4*a* detects a state change of the input switch 8*a* caused by the operation of a user, and information of the electrical power unit, such as remaining fuel level information, is displayed on the portable electronic device, by utilizing the timewise divided power supply pulse P. In this embodiment, the normal power supply pulse P is divided timewise and transmitted as shown in FIG. 7. However, information is transmitted by utilizing the number of power supply pulse having the same interval therebetween or an interval with a specific value or more. The control with the control IC 4*a* for the purpose of controlling the power supply pulse may be realized by equally dividing an interval between the upper limit voltage and the lower limit voltage (or between the upper limit current and the lower limit current) into a several equivalents, or by a timer function. In FIG. 7, the altered power supply pulse is transmitted over one cycle after the operation by a user. However, the pulse may be continuously transmitted over several cycles. Alternatively, the information may be displayed to a user by utilizing a number of normal pulses, for example, one pulse for the first time, two pulses for the second time, and three pulses for the third time.

Next, a third embodiment will be described.

Figure 8:
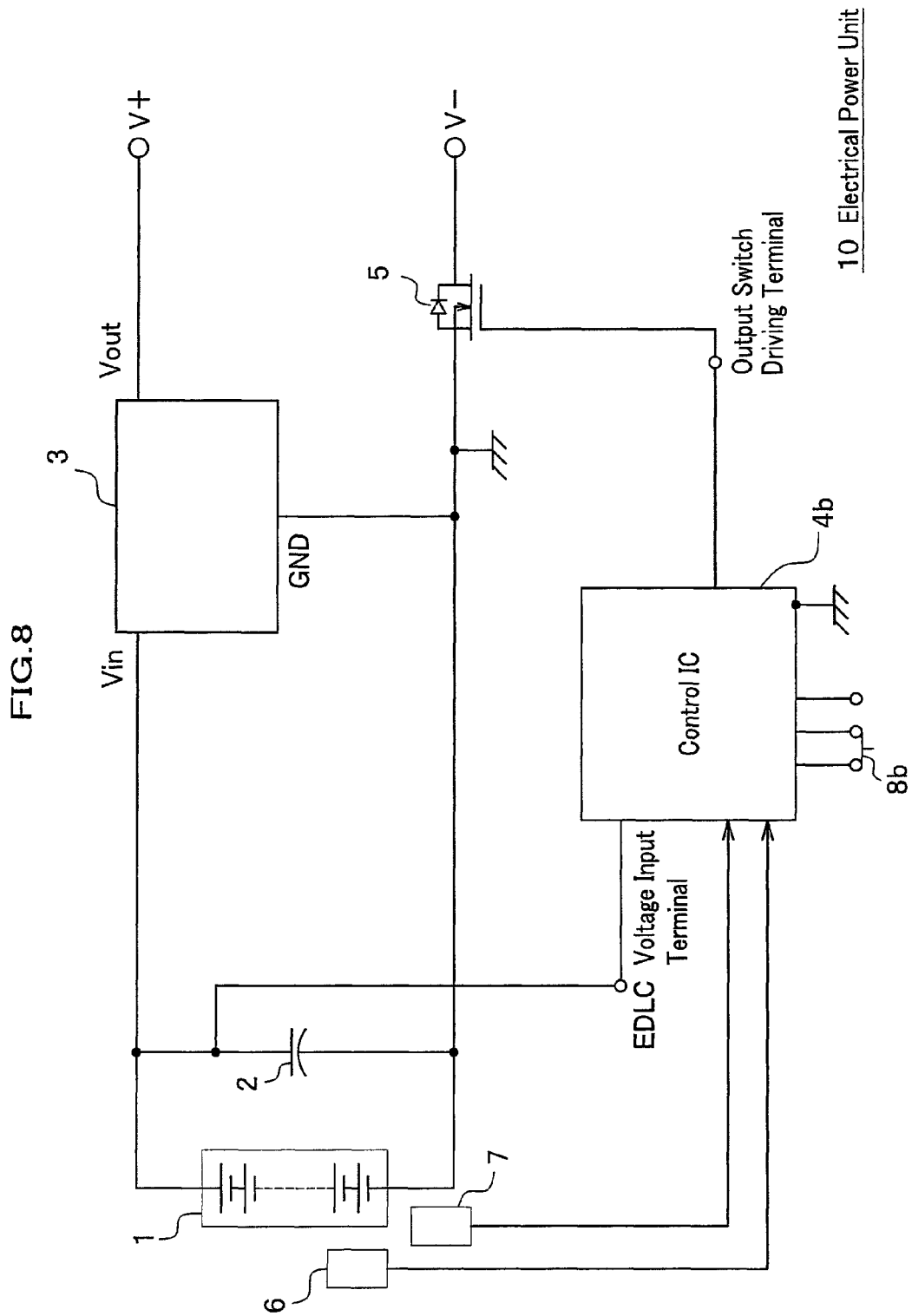
FIG. 8 is a circuit diagram of an electrical power unit according to a third embodiment.

FIG. 8 is a circuit diagram of an electrical power unit according to a third embodiment. This electrical power unit 10 shown in FIG. 8 is different from one shown in FIG. 1, in that a changeover switch (pulse alteration switch) 8b is added. The other components and arrangements are the same. For the changeover switch 8b, a slide switch or the like can be used. Of course, instead of the slide switch, a plurality of switches, such as push switch, may be used.

By operating the changeover switch 8b, in the control IC 4b, an upper limit voltage and a lower limit voltage for determining a voltage at the electric double-layer capacitor 2 are changed.

Figure 9:
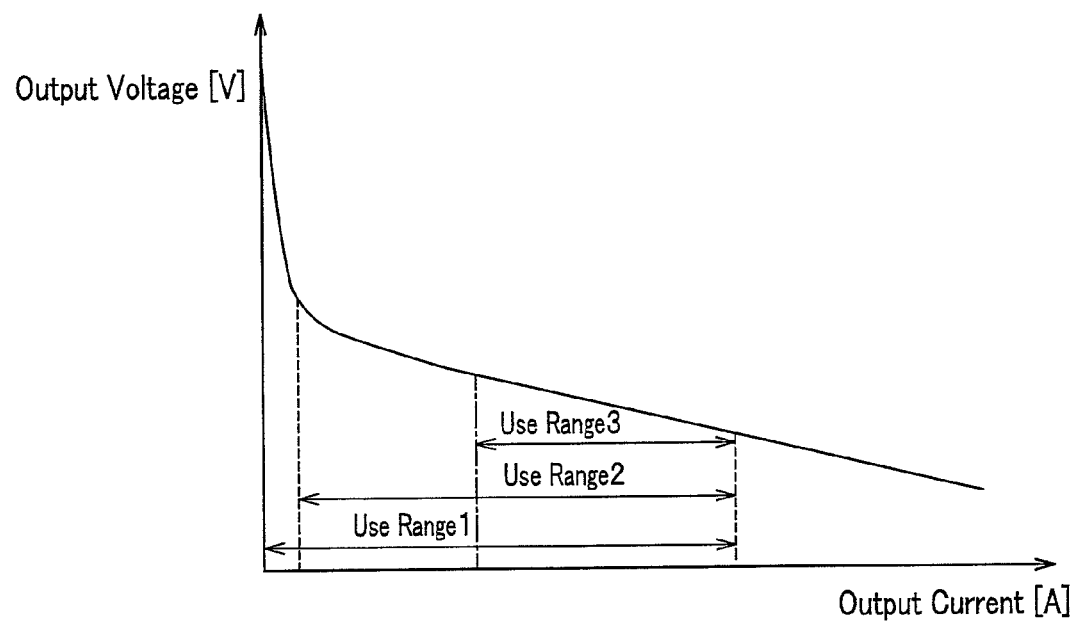
FIG. 9 is a graph showing output characteristics of the fuel cell.

As shown in FIG. 9, the fuel cell has output characteristics in which the output voltage decreases as the output current increases. Therefore, for example, when the lower limit voltage and the upper limit voltage for controlling the voltage of the electric double-layer capacitor 2 are set at those of a use range 1 shown in FIG. 9, and the upper limit voltage is switched to a lower one, such as that of a use range 2 or use range 3, a cycle of the power supply pulse P shown in (a) of FIG. 2 becomes short, and therefore, a cycle of the pulse groups P1, P2 shown in (b), (c) of FIG. 2 become short as well. Accordingly, the display cycle can be altered according to the preference of a user. Of course, threshold values of both the upper limit voltage and the lower limit voltage may be altered. Moreover, a power supply pulse corresponding to selected characteristics of the portable electronic device may be supplied, by assigning states of the input switch 8b to respective characteristics of the portable electronic device, with an operation by a user.

Next, a fourth embodiment will be described.

Figure 10:
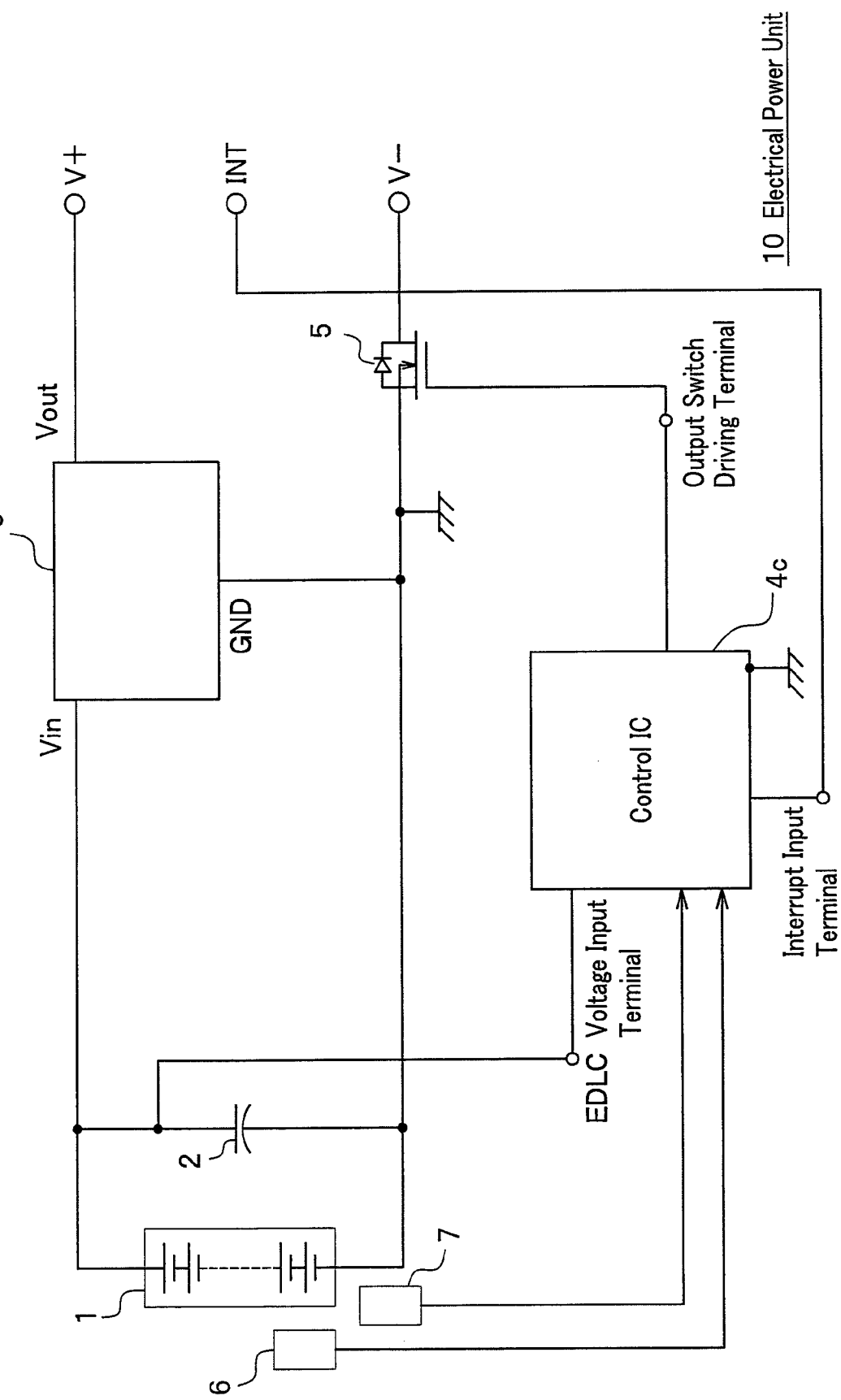
FIG. 10 is a circuit diagram of an electrical power unit according to a fourth embodiment.

FIG. 10 is a circuit diagram of an electrical power unit according to a fourth embodiment.

Figure 11:
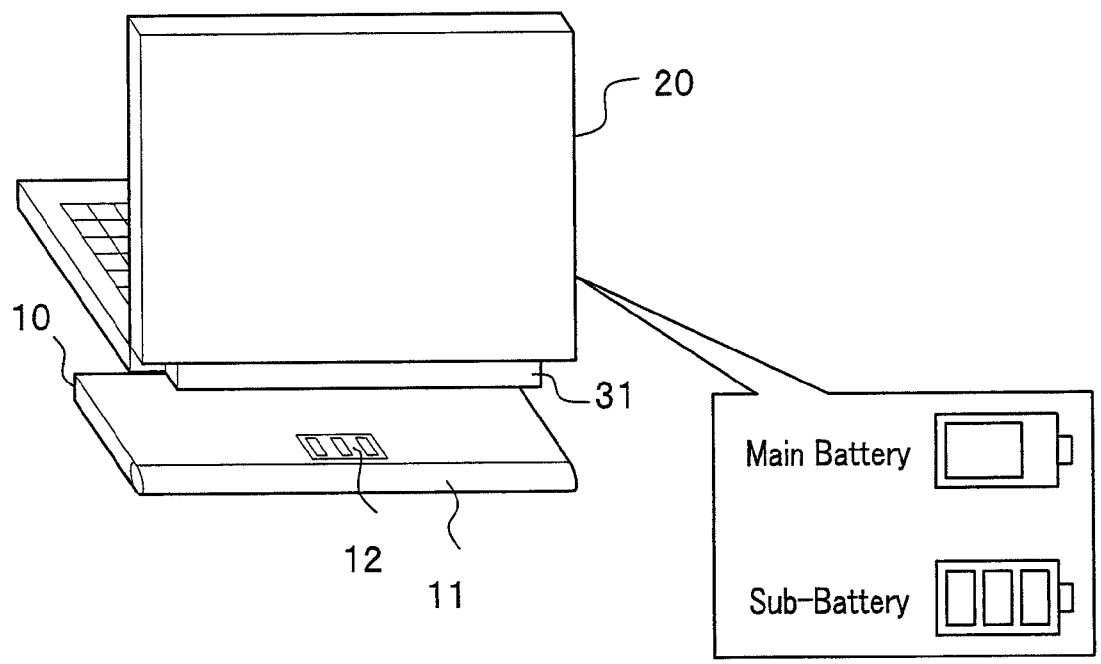
FIG. 11 is an explanatory diagram in which an electrical power unit is used with a portable personal computer.

In the case where a portable personal computer 20' is used as the portable electronic device as shown in FIG. 11, an output terminal of an interrupt signal is typically provided at a connecting terminal 31. Corresponding to this output terminal, the electrical power unit 10 is provided with an INT 12 as an input terminal for an interrupt signal, in addition to the power output terminal, in order to enable an input of the interrupt signal. The interrupt signal is output when the electrical power unit 10 is properly connected to the connecting terminal 31 and the power is supplied. Therefore, in a case where the electrical power unit is used for the portable personal computer 20' from which such an interrupt signal is output, in addition to two terminals, i.e., the output terminals V+ and V− for power supply, an INT terminal for inputting the interrupt signal is also provided as shown in FIG. 10, through which the interrupt signal is input to the control IC 4c. The electrical power unit 10 checks a cell condition only when the interrupt signal is input, and divides timewise the power supply pulse P and transmits the divided pulse. Processings after the input of the interrupt signal from the portable personal computer 20' are the same as those of the second embodiment.

In the second embodiment, as shown in FIG. 6, the changeover switch 8a is connected to the control IC 4a and a user operates the changeover switch 8a to display a remaining fuel level or an abnormality in the fuel cell 1 on the portable electronic device; while in the fourth embodiment, instead of the input switch 8a operable by a user, an interrupt signal (input signal) from the portable electronic device is used for dividing timewise the power supply pulse P to display a state of the fuel cell 1, as shown in FIG. 7.

Herein, as the portable electronic device, the portable personal computer 20' is used. In this portable personal computer 20', by an input of a power supply pulse, the electrical power unit 10 is recognized as a sub-battery, and at the same time, an image is displayed on a screen of the portable personal computer 20' that shows that the main battery and the sub-battery are connected, as shown in FIG. 11, for example. After the input of the power supply pulse P, the portable personal computer 20' outputs an interrupt signal to the INT terminal connected to the interrupt input terminal, to thereby allow the electrical power unit 10 to transmit the power supply pulse P. The portable personal computer 20' counts, for example, the pulse number, and displays the remaining fuel level of the electrical power unit 10 on the screen. Since there may be a case where the interrupt on the INT terminal by the portable personal computer 20' coincides with the normal power supply period, it is desired that the pulse number be counted at rising. It should be noted that, when there is no response for a specific period of time or abnormality information of the fuel cell 1 is transmitted after the interrupt signal is output to the INT terminal, the display of the sub-battery is deleted from the screen, as it is determined by the portable personal computer 20' that the power is not supplied from the electrical power unit 10. With this configuration, a user can recognize when the electrical power unit 10 does not supply power. In this case, the information may be displayed to a user by a popup view.

Next, as a modified embodiment, a description is made in a case where a primary cell or a secondary cell, instead of the fuel cell 1, is used for the cell 1.

For example, in the circuit shown in FIG. 1, when a primary cell or a secondary cell is used for the cell 1 instead of the fuel cell 1, the voltage of the primary cell or the secondary cell decreases as an electrical discharge proceeds. The remaining battery level can be determined by monitoring the voltage. In order to display the remaining battery level, the lower limit voltage is set at, for example, an extinction voltage of the cell (in the case of lithium cell, 2.7 V or 3.0 V). The upper limit voltage may be set at the voltage near the above-mentioned lower limit voltage (e.g., the lower limit voltage plus 0.1 V). Alternatively, the upper limit voltage may not be particularly set at a specific value, and a time period in which the voltage is above the lower limit voltage may be measured by a timer function.

By setting the upper limit voltage and the lower limit voltage as described above, the remaining level can be detected by the portable electronic device. First, the control IC 4 detects that the voltage of the primary cell or the secondary cell 1 reaches the lower limit voltage, and controls the output switch 5 to switch off to thereby stop the electrical discharge. The termination of the discharge raises the voltage of the primary cell or the secondary cell 1. When the voltage of the primary cell or the secondary cell 1 reaches the upper limit voltage, the electrical discharge is resumed, and when the voltage does not recover to the upper limit voltage, the electrical discharge is terminated. In this situation, a period of lighting of the charge pilot lamp on the portable electronic device becomes gradually short, and a user can check whether or not there is a fuel shortage in the cell 1.

Next, a protection circuit of the electric double-layer capacitor will be described.

In the embodiments above, the direct methanol fuel cell is used for the fuel cell 1, and therefore as shown in the characteristics diagram of FIG. 9, there is a notable difference especially between the lower limit voltage used and the open-circuit voltage (OCV) as the maximum voltage. Therefore, especially in FIG. 9, when a control range is set at the use range 1 or 2 having a high upper limit voltage, the electric double-layer capacitor 2 may be used at a value around the limit of the withstand voltage. In this case, in order to protect the electric double-layer capacitor 2, it is desirable that the circuit be provided with a protection circuit for limiting the voltage.

Figure 12:
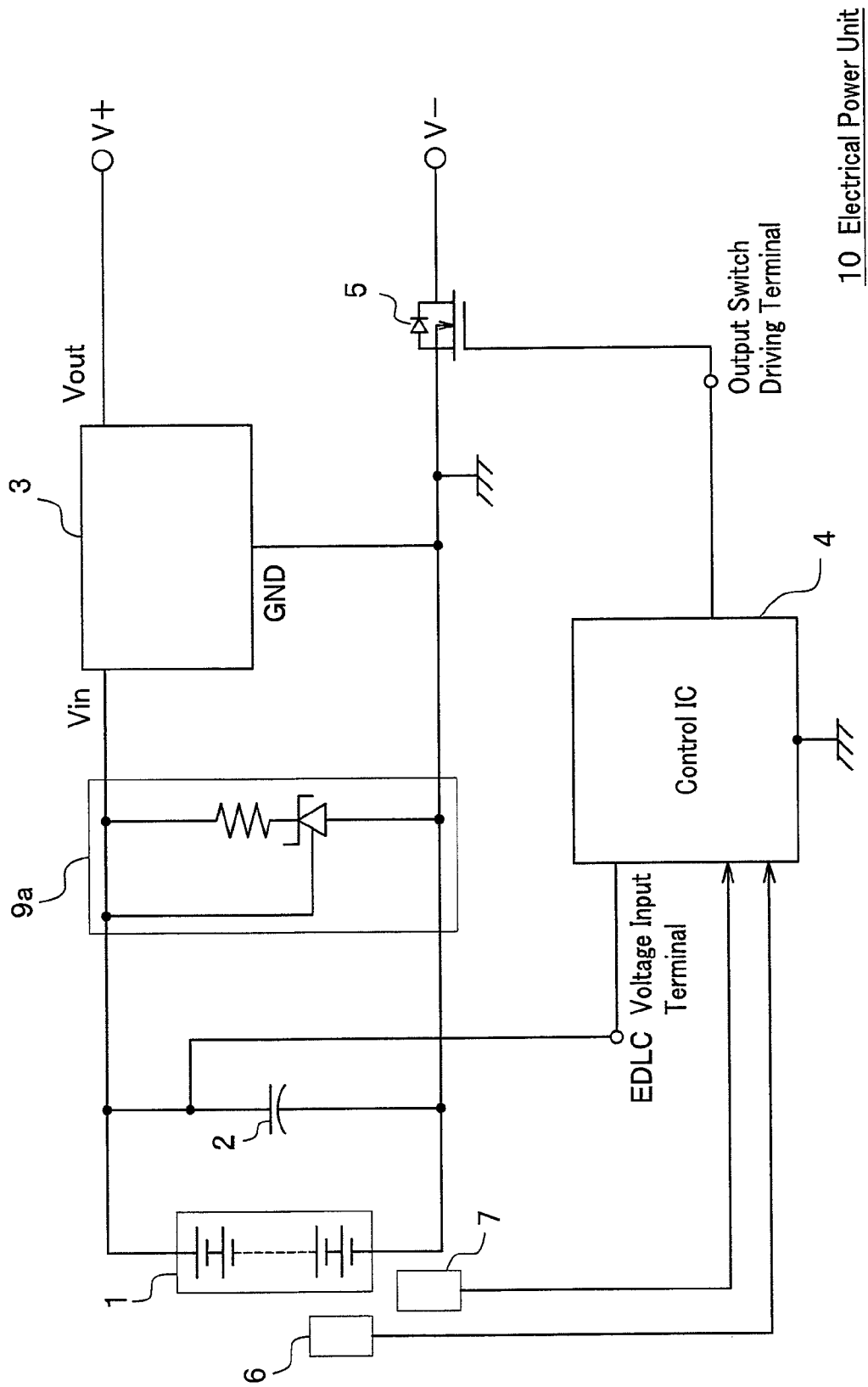
FIG. 12 is a circuit diagram of an electrical power unit with a protection circuit.

FIG. 12 is a circuit diagram of an electrical power unit with a protection circuit. The protection circuit 9a is connected to the DC/DC converter 3 on an input terminal Vin side, and when the voltage of the fuel cell 1 exceeds a set cut-off voltage, they become electrically continuous, to thereby limit the maximum output voltage of the fuel cell 1 to the cut-off voltage or less.

In this case, when the DC/DC converter 3 is a step-up converter, the current value cut off by the protection circuit 9a becomes high, and therefore each device used in the protection circuit 9a should have a large allowable dissipation.

Figure 13:
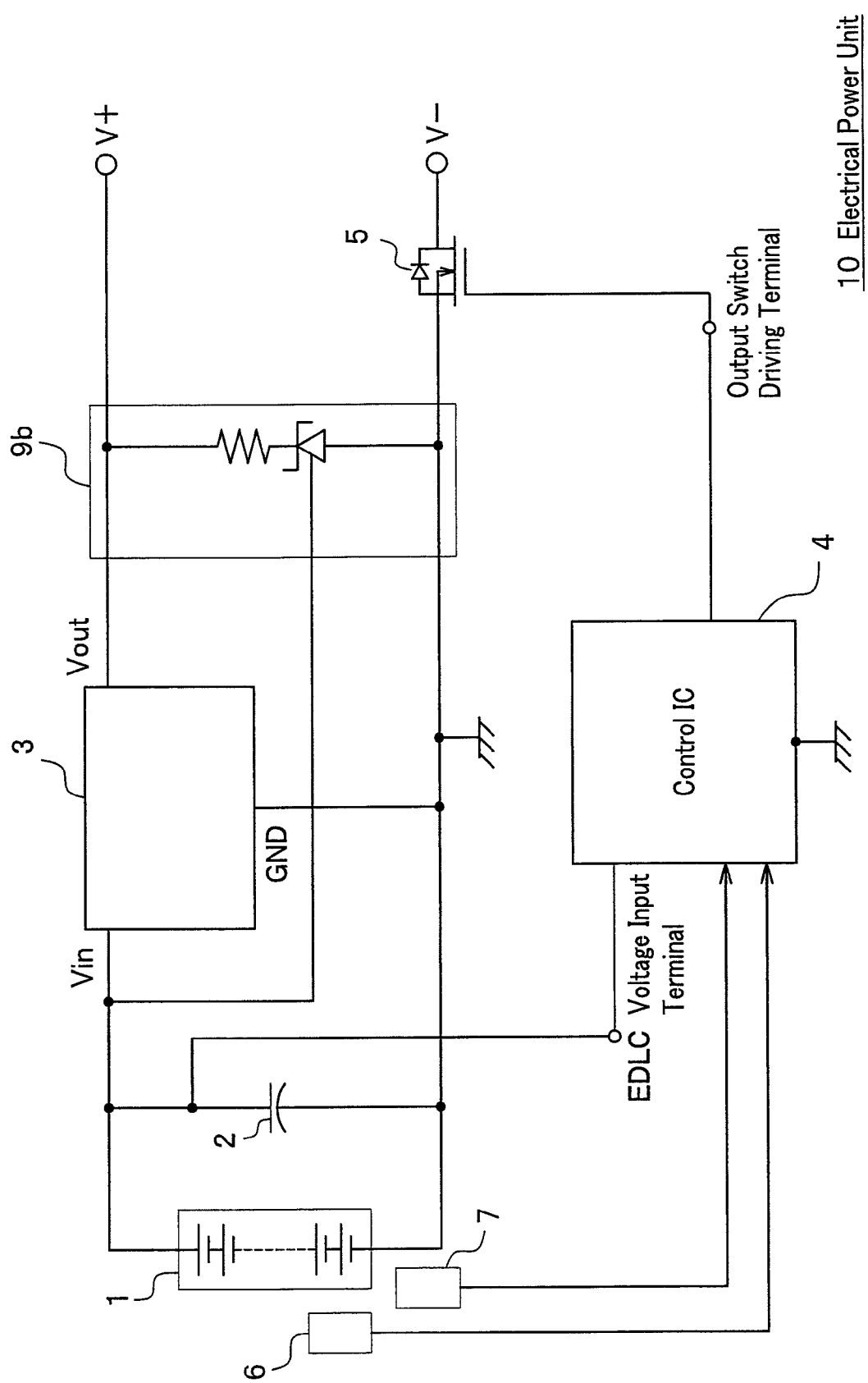
FIG. 13 is a circuit diagram of an electrical power unit with another protection circuit.

In order to avoid this, as shown in FIG. 13, the protection circuit 9b may be connected to the DC/DC converter 3 on an output terminal Vout side. In this case, the voltage of the output terminal Vout is higher than the input terminal Vin of the DC/DC converter 3, and therefore, the current to be cut can be made small. As a result, a device with a small allowable dissipation can be used, providing advantage of down-sizing.

Figure 14:
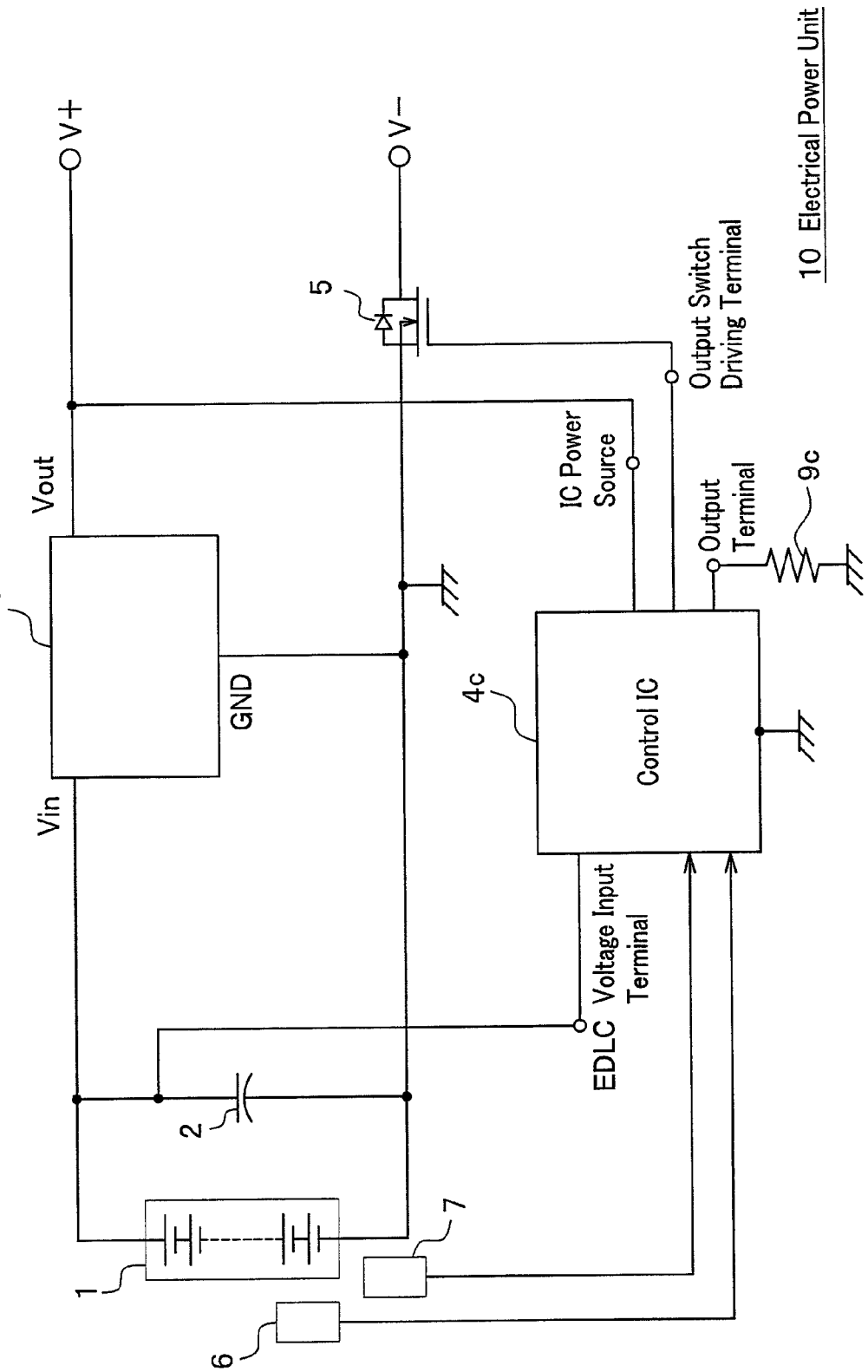
FIG. 14 is a circuit diagram of an electrical power unit in which a control function of a control IC is used as a protection circuit.

When an output of the DC/DC converter 3 to the control IC 4c is used as a power source as shown in FIG. 14, for example, by connecting the output terminal to the ground (GND) through the resistor 9c and allowing the control IC 4c to switch the output terminal on, voltage can be cut, which serves as a protection circuit.

Next, other modified embodiments will be described.

Figure 15:
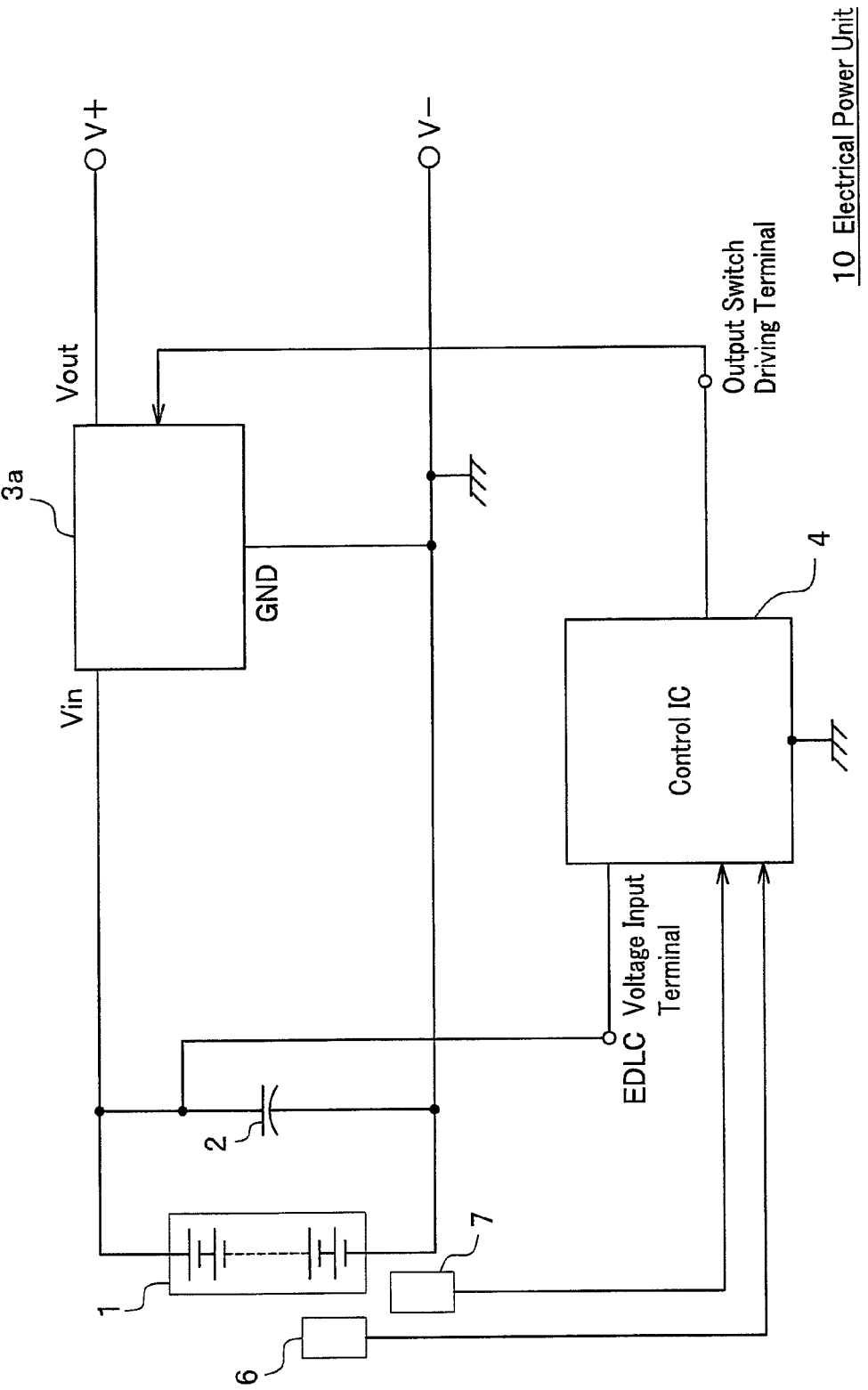
FIG. 15 is a circuit diagram of an electrical power unit in which an output switch is omitted.

FIG. 15 is a circuit diagram of an electrical power unit in which an output switch is omitted, as compared with the electrical power unit of FIG. 1.

The output switch driving terminal of the control IC 4 is directly connected to the control terminal of the DC/DC converter 3a. Switching on and off of the output power of the DC/DC converter 3a can be performed by controlling the output voltage of the DC/DC converter 3a with the control IC 4.

Figure 16:
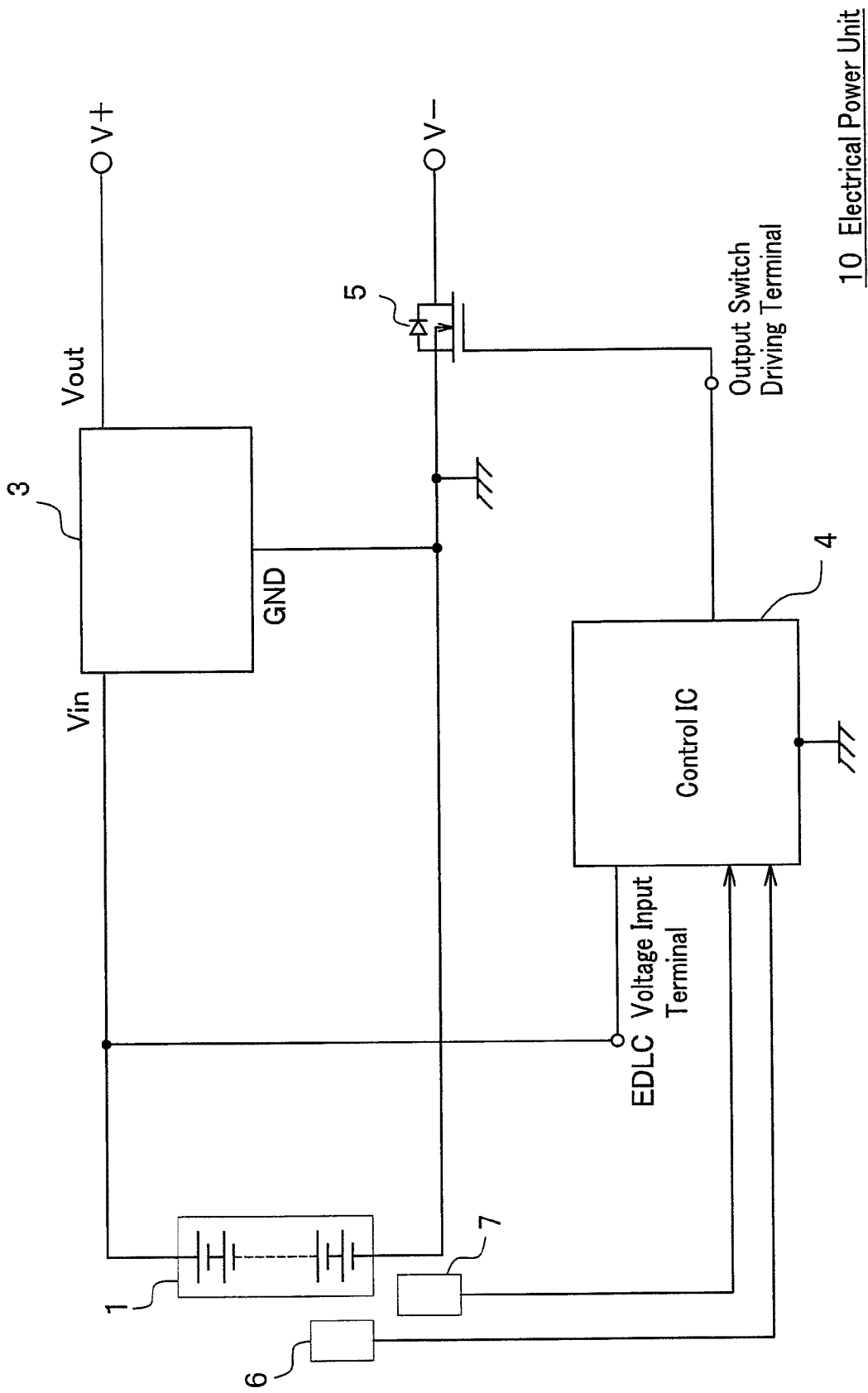
FIG. 16 is a circuit diagram of an electrical power unit in which an electric storage means is omitted.

FIG. 16 is a circuit diagram of an electrical power unit in which an electric storage means is omitted, as compared with the electrical power unit of FIG. 1.

Since this circuit has no electric storage means, it is necessary to set the output of the fuel cell 1 higher than the maximum power of the portable electronic device. In this case, unlike the embodiments above, the power supply pulse is not required for supplying power, and thus a continuous power supply can be performed. The remaining fuel level and the abnormality in the fuel cell 1 can be displayed by, as described above, controlling the output switch 5 or the DC/DC converter 3 and forming a specific number of power supply pulses with a specific duty ratio, in the output power.

In the embodiments above, by controlling the voltage of the fuel cell 1, the output power of the fuel cell is controlled. The above-mentioned control can be realized based on either one of voltage value and current value. Especially when the control is based on the current value, a change in the output becomes large due to environmental conditions, including temperature and humidity. Therefore, it is desirable that the upper limit value and the lower limit value be modified using sensed environmental information.

FIG. 17 is a circuit diagram of an electrical power unit in which a control is performed based on an output current of a fuel cell.

In the above-mentioned embodiments and modified embodiments, the output power is switched on and off by controlling the output switch 5 with the control IC 4 based on the output voltage of the fuel cell 1. On the other hand in this embodiment, a resistor R is disposed between the fuel cell 1 and the electric double-layer capacitor 2, the output current of the fuel cell 1 is converted into voltage at the resistor R, and input to the current input terminal of the control IC 4. In the control IC 4, the output switch 5 is switched on and off based on the output current value of the fuel cell 1; at the lower limit current value, the output switch 5 is switched on to thereby output the power, while at the upper limit current value, the output switch 5 is switched off to thereby block output power. With this configuration, a similar effect can be obtained to those described with respect to the above-mentioned embodiments in which the control is performed based on voltage.

The invention claimed is:

1. An electric power unit connected to an electronic device that displays a power supplied state, the electrical power unit comprising:

an electrical double-layer capacitor;

a fuel cell for supplying power to the electric double-layer capacitor and the electronic device;

wherein the fuel cell and the electrical double-layer capacitor are connected in parallel; and a controller for supplying power supply pulses by switching on an output switch when a voltage of the electric double layer capacitor exceeds an upper threshold and switching off the output switch when the voltage of the electric double layer capacitor reaches a lower threshold, and for intermittently altering output power of the electric power unit based on a time division approach to transmit a control pattern in accordance with an abnormality in the fuel cell;

wherein an output power of the fuel cell is kept substantially equal to an average voltage of power required in the portable electronic device and kept small than a maximum power required, the electric double layer capacitor has a higher power density than that of the fuel cell, and the electronic device is allowed to display state information of the fuel cell by altering a displaying mode of the electronic device when the electronic device is supplied with power.

2. The electrical power unit according to claim 1, further comprising a changeover switch operable by a user, wherein, when the changeover switch is operated, the controller intermittently alters the output power of the electric double-layer capacitor to transmit state information of the fuel cell.

3. The electrical power unit according to claim 1, further comprising a pulse alteration switch operable by a user, wherein, when the pulse alteration switch is operated, a period length of at least one of non-power supplying periods between a power supply pulse and adjacent two power supply pulses thereto is altered.

* * * * *